(12) United States Patent
Bland et al.

(10) Patent No.: US 7,930,573 B2
(45) Date of Patent: Apr. 19, 2011

(54) WORKLOAD APPORTIONMENT ACCORDING TO MEAN AND VARIANCE

(75) Inventors: Patrick Maurice Bland, Raleigh, NC (US); Yiyu Chen, Zurich (CH); Angela Beth Dalton, Austin, TX (US); Amitayu Das, Sunnyvale, CA (US); Richard Edwin Harper, Chapel Hill, NC (US); William Joseph Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 11/857,257

(22) Filed: Sep. 18, 2007

(65) Prior Publication Data

US 2009/0077398 A1    Mar. 19, 2009

(51) Int. Cl.
*G06F 1/26* (2006.01)
*G06F 15/173* (2006.01)

(52) U.S. Cl. ........ 713/320; 713/300; 713/322; 713/324; 709/217; 709/223; 709/225; 718/105

(58) Field of Classification Search .................. 713/300, 713/320, 322, 324; 709/217, 223, 225; 718/105
See application file for complete search history.

(56) References Cited

U.S. PATENT DOCUMENTS

| | | | | |
|---|---|---|---|---|
| 5,867,706 A | * | 2/1999 | Martin et al. | 718/105 |
| 6,223,205 B1 | * | 4/2001 | Harchol-Balter et al. | 718/105 |
| 6,681,251 B1 | | 1/2004 | Leymann et al. | |
| 6,748,413 B1 | * | 6/2004 | Bournas | 718/105 |
| 6,795,928 B2 | | 9/2004 | Bradley et al. | |
| 7,260,113 B2 | * | 8/2007 | Lynn et al. | 370/468 |
| 2002/0007463 A1 | | 1/2002 | Fung | |
| 2003/0158940 A1 | | 8/2003 | Leigh | |
| 2003/0177406 A1 | | 9/2003 | Bradley et al. | |
| 2004/0047289 A1 | * | 3/2004 | Azami et al. | 370/230 |
| 2004/0103194 A1 | * | 5/2004 | Islam et al. | 709/225 |
| 2004/0107273 A1 | | 6/2004 | Biran et al. | |
| 2004/0236817 A1 | * | 11/2004 | Huberman et al. | 709/200 |
| 2007/0043808 A1 | * | 2/2007 | Agnoli et al. | 709/201 |
| 2008/0222646 A1 | * | 9/2008 | Sigal et al. | 718/105 |
| 2009/0007101 A1 | * | 1/2009 | Azar et al. | 718/1 |

* cited by examiner

*Primary Examiner* — Vincent T Tran
(74) *Attorney, Agent, or Firm* — Cynthia G. Seal; Jeffrey L. Streets

(57) ABSTRACT

An improved method is provided for managing workload on a multi-server computer system. In one embodiment, a subset of servers is selected according to an anticipated net workload. The remaining servers in the system may be powered off to conserve energy and prolong equipment life. Workload is dynamically apportioned among the subset of servers at selected intervals to more uniformly distribute the mean and variance of the workload among the subset of servers. More particularly, the mean and the variance for each of a plurality of workload units are equally weighed in determining a ranking of the workload units. The workload units may be ordered according to a mathematical combination of the mean and variance, such as the sum or product of mean and variance for each workload unit. The workload units are allocated among the subset of servers in according to rank, such as by assigning the workload units to the servers in a reverse round-robin fashion according to rank. Predictive power management schemes such as DVS and DVFS may then be used to control power to the servers.

15 Claims, 5 Drawing Sheets

WORKLOAD APPORTIONMENT ACCORDING TO MEAN AND VARIANCE

BACKGROUND OF THE INVENTION

1. Field of the Invention

The present invention relates to workload allocation and power management in a computer system.

2. Description of the Related Art

Large computer systems often include many interconnected servers and other computer hardware consolidated within a central location such as a data center. Computer systems of this size are capable of performing many hundreds or thousands of processing jobs distributed among the many servers. Thus, managing the workload and judiciously allocating the workload among the many servers is an important consideration. Additionally, computer systems consume power commensurate with the amount of workload, and power consumption affects the cost of operating a computer system, as well as the amount of heat and noise generated by the computer system. Therefore, managing power is another important consideration when operating a computer system. Optimizing the efficiency of a computer system helps to minimize expense, heat production, and noise.

Dynamic Voltage Scaling (DVS) or Dynamic Voltage and Frequency Scaling (DVFS) are two types of predictive power management schemes that can be used to manage power in a computer system. Such power management schemes are based on the relationship of power consumption to the core voltage and frequency of processors, which is commonly expressed as $P \propto fV^2$. These techniques are used to dynamically adjust voltage (DVS) or voltage and frequency (DVFS) on each server based on a prediction of the anticipated performance. The predictive nature of these techniques has an associated level of uncertainty. This uncertainty can lead to excessive energy consumption when the voltage or frequency needed to support a workload is overestimated, and can cause missed demand during periods when the voltage or frequency needed is underestimated.

As the performance and power of computer systems continue to advance, there is an ongoing need for improved workload allocation and power management solutions. In particular, it would be desirable to increase the certainty involved with power and workload management to improve the accuracy and performance of existing predictive power management schemes. Furthermore, it would be desirable to allocate workload evenly across an appropriate number of processors.

SUMMARY OF THE INVENTION

Systems and methods are provided for managing workload in a computer system that runs a plurality of workload units, which may be a client application. One embodiment provides a method of managing workload in a computer system having a plurality of servers that collectively run a plurality of workload clients. According to this method, the workload mean and the workload variance is obtained for each of the plurality of clients. The clients are ranked according to a mathematical combination of the mean and the variance and are distributed among the servers according to their rank. The steps of obtaining the workload mean and workload variance are periodically repeated. Another embodiment provides a computer program product comprising a computer usable medium including computer usable program code for managing workload in a computer system. The computer program product includes computer usable program code for obtaining the workload mean and workload variance associated with each of a plurality of clients, for ranking the clients according to a mathematical combination of the workload mean and the workload variance, for apportioning the clients among the servers according to rank, and for periodically repeating the steps of obtaining the workload mean and workload variance, ranking the clients, and apportioning the clients among the servers. Other embodiments, aspects, and advantages of the invention will be apparent from the following description and the appended claims.

DETAILED DESCRIPTION OF PREFERRED EMBODIMENTS

The present invention provides improved methods of managing workload on a multi-server computer system. In one embodiment, workload is allocated among a plurality of servers according to a two-tier process. The first tier sub-process ("Tier I") may be performed according to a major time interval and the second tier sub-process ("Tier II") may be performed according to a minor time interval, such that multiple iterations of Tier II are performed for each iteration of Tier I. Tier I involves selecting a subset of servers sufficient to support an anticipated net workload, and powering off the remaining servers to conserve energy and prolong equipment life. To determine which servers will be powered on or off, a straightforward heuristic technique may be used, wherein the servers that have been powered off the longest are powered on and servers that have been powered on the longest are powered off to achieve the selected number of servers powered on. Tier II involves dynamically allocating the workload among the subset of servers selected according to Tier I. In particular, workload is redistributed among the servers at regular intervals according to the mean and variance of the workload on each server, to more uniformly distribute the workload among the subset of servers.

Any number of workload units may be run on a computer system. One example of a workload unit used by way of illustration is a workload "client", although a workload unit may also be a "job," "application," or other demarcation of a workload unit known in the art. A computer system may include hundreds of servers collectively supporting a net workload consisting of many workload clients. The mean and the variance for each of a plurality of workload units is monitored during Tier II. The mean and variance are then weighed according to the invention to determine a relatively ranking of the workload units. For example, the relative rank of a set of clients may be determined according to a mathematical combination of the mean and variance for each workload unit, such as the sum or product of the mean and variance. The mathematical combination may be obtained or at least described graphically. The workload units are then allocated among the subset of servers according to rank, such as by assigning the workload units to the servers in a reverse round-robin fashion according to rank. This approach more uniformly distributes the mean and variance of the workload among the servers, which increases the accuracy of predictive power management schemes such as DVS and DVFS used to control power to the servers.

Figures 1, 2:
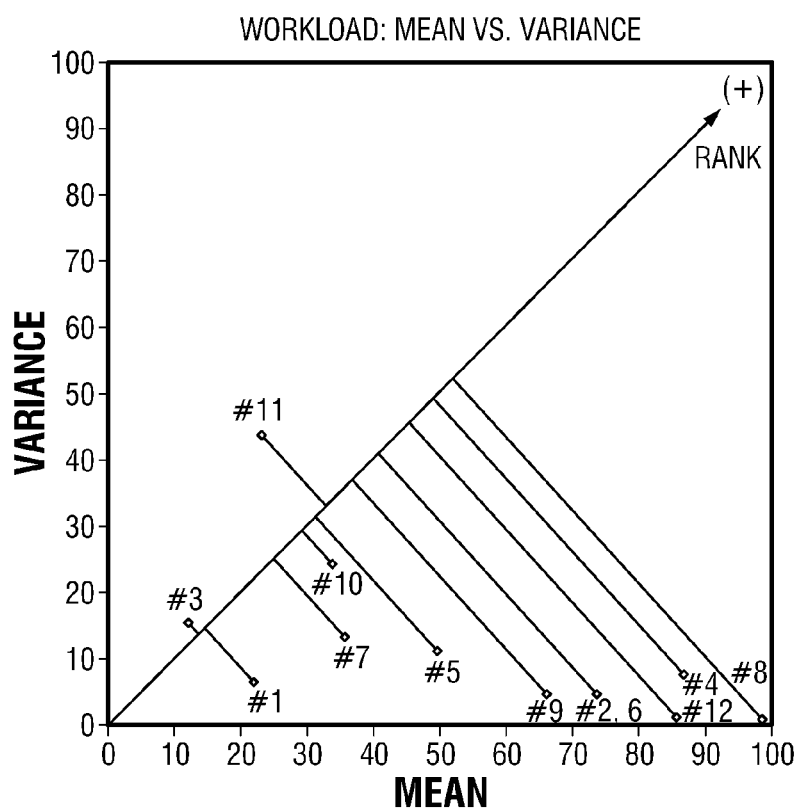
FIG. 1 is a table listing workload data for a hypothetical sample of twelve clients.
FIG. 2 is a scatter plot of the hypothetical data sample of FIG. 1, graphically illustrating the ordering of the twelve clients according to an equal weighing of their respective mean and variance values.

FIG. 1 is a table 10 listing workload data for a small, hypothetical sample of twelve clients. A client ID column 20 uniquely identifies each client by an integer between 1 and 12. Average (mean) workload values are listed in a mean column 22, and variance is listed in a variance column 24. In the table 10, these relative mean and variance values are expressed numerically on a scale from 1 to 100. The 1-100 scale provides a convenient basis for comparing the relative values of mean and variance for purpose of discussing this embodiment of the invention, but implementing the invention does not require computing the various workload parameters on this particular scale. The workload attributable to a client is the amount of data or traffic being carried by the servers that results from the running of that client. Exemplary workload metrics include but are not limited to CPU utilization, network I/O traffic, disk I/O traffic, and memory utilization.

As the table 10 illustrates, the mean and variance of the workload may both vary dramatically from client to client. Therefore, without judiciously apportioning the clients among the servers, the mean and variance of each server's aggregate workload is likely to differ widely. This could result in inconsistent power regulation from server to server, due to the predictive nature of algorithms such as DVS and DVFS. Power regulation will generally be less reliable on servers with higher aggregate mean and variance. Re-distributing the clients among the servers only according to the mean workload values provides some improvement in power management, but still does not fully optimize the workload distribution without also considering variance. According to invention, therefore, both the variance and the mean of the workload of each client are considered in ranking the clients and apportioning the client workloads among the servers. In one embodiment, the mean and variance of the workload of a particular client may be equally weighted in determining a relative ordering or "rank" of the clients, and the clients may be apportioned to servers according to rank in a manner that better balances mean and variance of the overall workload among the servers.

FIG. 2 is a scatter plot of the hypothetical data sample of FIG. 1, graphically illustrating the ordering of the twelve clients according to an equal weighing of their respective mean and variance values. The mean workload value is plotted against the variance for each client, wherein the horizontal ("X") axis represents the mean and the vertical ("Y") axis represents the variance. The X and Y axis are drawn to the same scale, and a diagonal (forty-five degree) reference line is drawn from the origin. Twelve client data points (labeled from #1 to #12) correspond to the twelve clients in the sample. Each data point is orthogonally projected onto the diagonal line, and the point of intersection for each client data point establishes the client's relative rank. The value of R for each client, as drawn, is the distance from the origin to the client's point of intersection, which in the figure is mathematically equal to $(X+Y)*1/SQRT(2)$. This illustrates that the order or "rank" of a client relative to other clients may be proportional to the sum of its mean and its variance over a prescribed interval. The actual value of R as computed according to this expression may have no intrinsic significance (e.g., the inverse of the square root of two is a constant, which does not change the relative ranking). Rather, applying the expression to obtain the R values for the clients is one way to establish the relative rank of the clients. The clients are then apportioned among the servers according to this ranking, such as by assigning the clients in order of increasing or decreasing rank to the servers according to a regular, repeating server assignment protocol.

Figure 3:
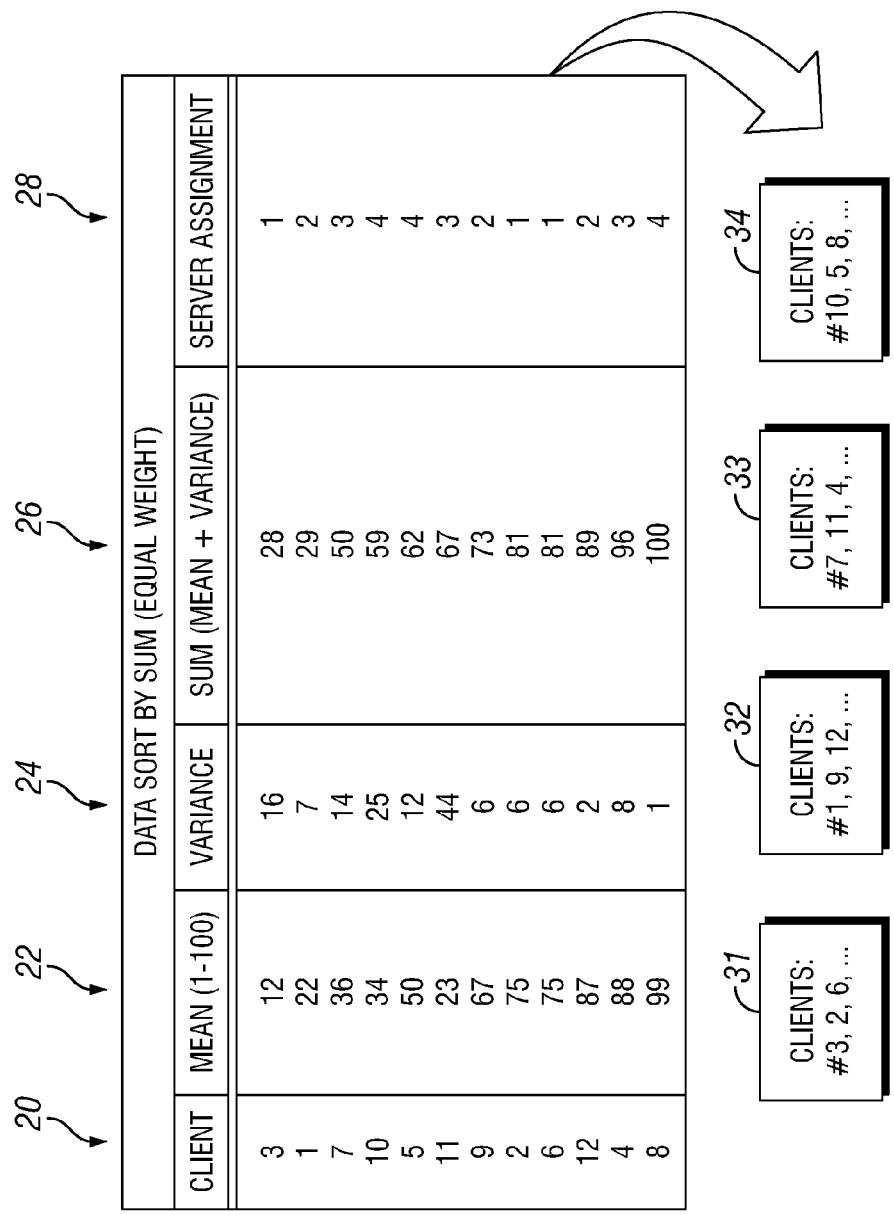
FIG. 3 is a table wherein the workload data of FIG. 1 is sorted according to the sum of the mean and the variance for each client, producing the same ranking graphically determined in FIG. 2

FIG. 3 is a table wherein the workload data of FIG. 1 is sorted according to the sum of the mean and the variance for each client. A summation column 26 is the sum of the mean column 22 and variance column 24. The summation column 26 may be used as an index for sorting the workload data, which produces the same order/ranking that was graphically determined in the plot of FIG. 2. These table operations may be quickly and efficiently implemented on a computer, such as with a database application (e.g. SQL) or a database-type object included with power management software according to the invention. For example, a computer can efficiently compute the summation column 26 and use the summation column 26 as an index to sort the workload data for many thousands of clients. It should be noted that the summation column 26 is only one example of a way to index the clients. Other mathematical combinations, such as the product (multiplication) of mean and variance, may be used to establish the same relative ranking of the clients.

The table of FIG. 3 further includes a server assignment column 28 reflecting a particular server assignment protocol, by way of example. The server assignment column 28 is followed when assigning the now-ordered clients to a hypothetical set of four servers 31, 32, 33, 34, in a so-called "reverse round-robin" repeating pattern (1-2-3-4-4-3-2-1- . . . ) until all the client have been assigned to one of the servers. Thus, the first server 31 is assigned clients #3, #2, and #6; the second server 32 is assigned clients #1, #9, and #12; the third server 33 is assigned clients #7, #11, and #14; and the fourth server 34 is assigned clients #10, #5, and #8. This apportionment of the clients, according to the sum of the mean and variance, serves to more uniformly distribute the mean and variance among the servers 31-34, so that each server 31-34 may have similar aggregate workload and variance. Though only twelve clients are apportioned in the example, hundreds or thousands of clients may be distributed among a group of servers in an actual computer system, and the effect of balancing mean and variance will generally be more pronounced with such larger numbers of clients.

Figure 4:
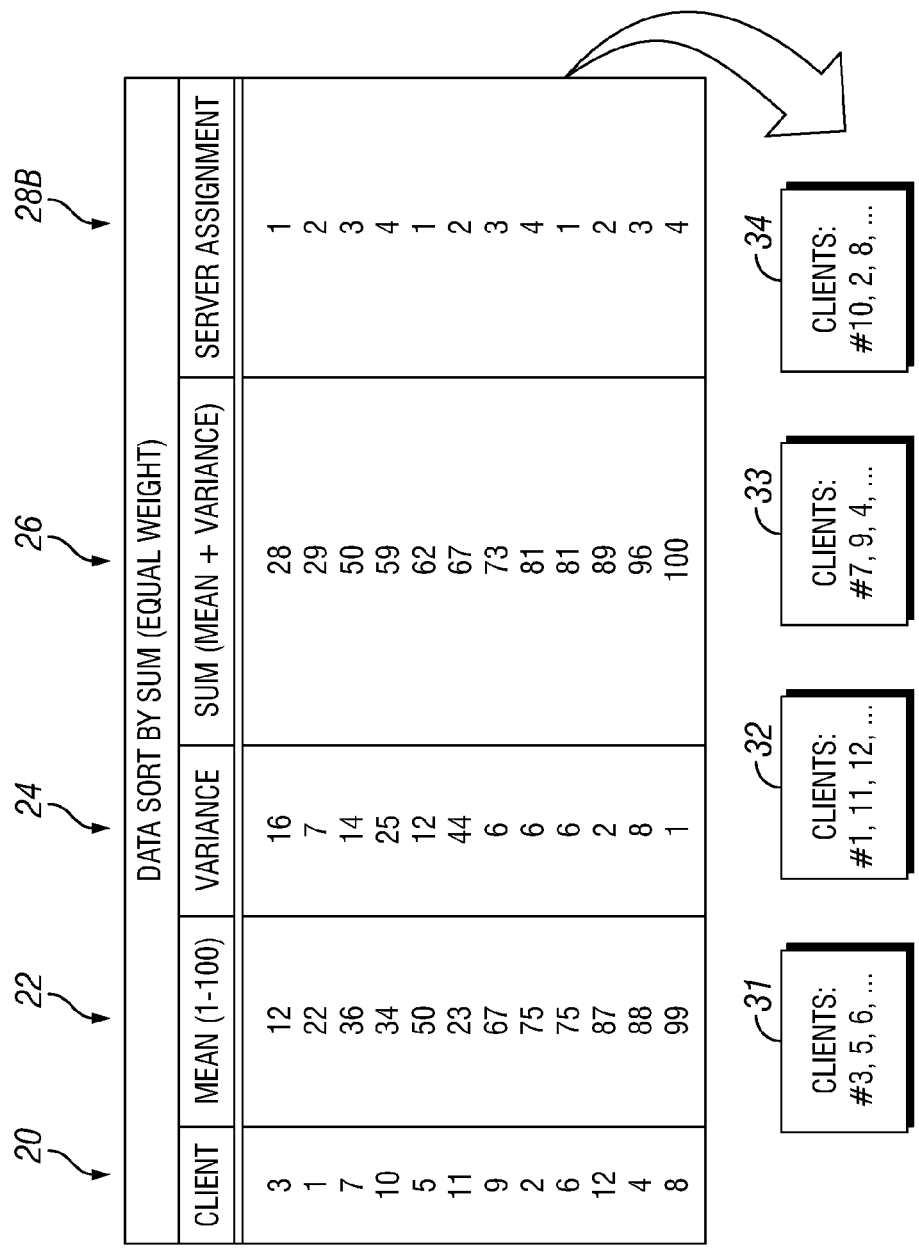
FIG. 4 is a table of the client workload data as sorted in FIG. 3, but including an alternative server assignment column for assigning the clients to the servers in an alternative pattern.

FIG. 4 is a table of the client workload data as sorted in FIG. 3, but including an alternative server assignment column 28B for assigning the clients to the servers 31, 32, 33, 34 in an alternative pattern (1-2-3-4-1-2-3-4- . . . ). Thus, the first server 31 is assigned clients #3, #5, and #6; the second server 32 is assigned clients #1, #11, and #12; the third server 33 is assigned clients #7, #9, and #14; and the fourth server 34 is assigned clients #10, #2, and #8. This alternative apportionment of the clients according to the sum of the mean and variance also uniformly distributes the mean and variance among the servers 31-34, so that each server 31-34 may have similar aggregate workload and variance. Again, the homogenization of mean and variance will generally be more effective with a larger numbers of clients.

The server assignments suggested in server assignment column 28 (FIG. 3) and column 28B (FIG. 4) are two non-limiting examples of how clients may be apportioned among a set of servers once a relative order based on equally weighted mean and variance is determined. Further alternative server assignment protocols will be apparent to one skilled in the art having benefit of this disclosure. Generally, server assignment protocols that apportion the ordered clients to a set of servers in a regular, repeatable pattern will tend to result in a homogenization of workload mean and variance among the servers.

Figure 5:
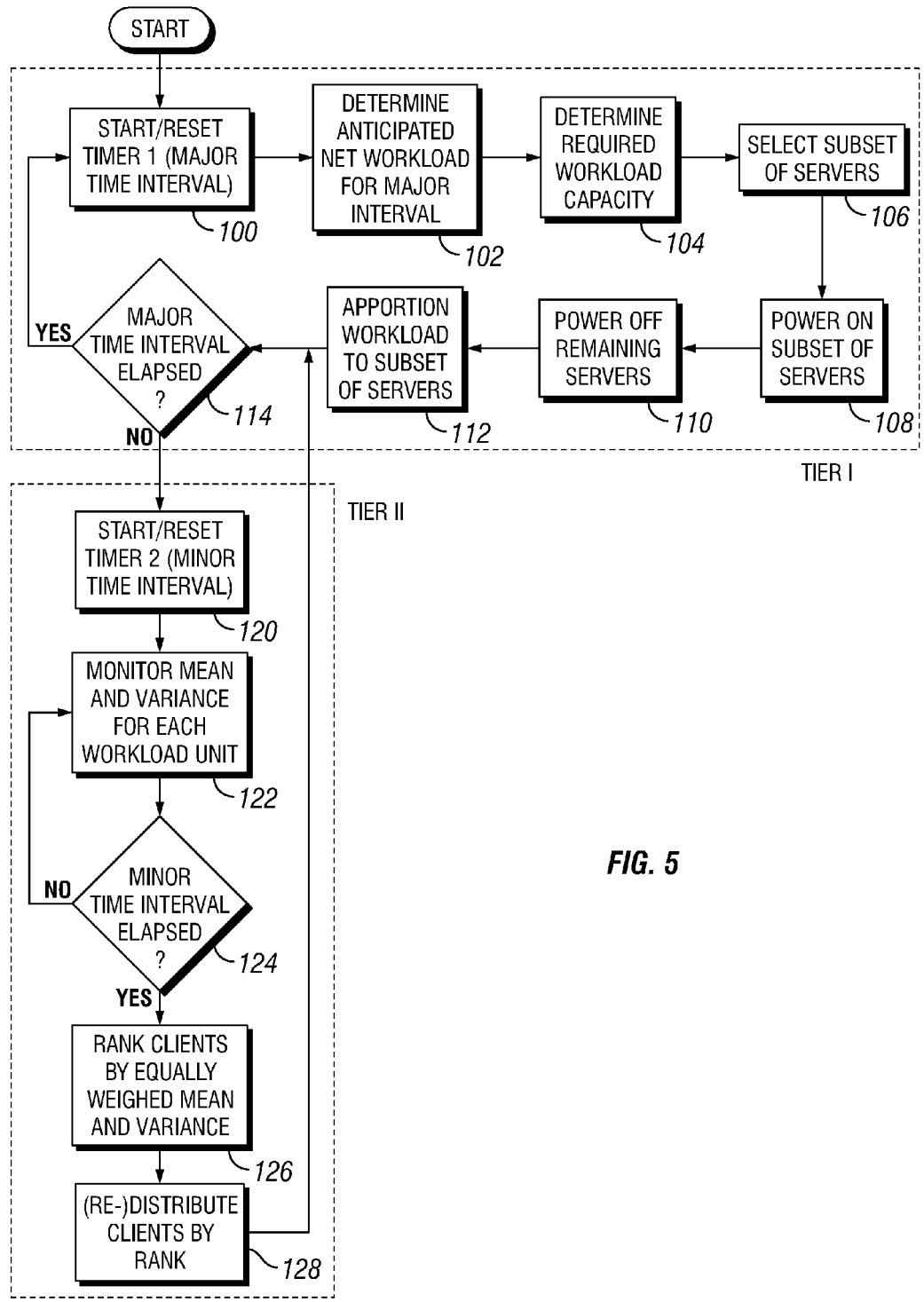
FIG. 5 is a flowchart of a method of managing workload in a computer system having a plurality of servers.

FIG. 5 is a flowchart of a two-tiered process of managing workload in a computer system having a plurality of servers, according to one embodiment of the invention. The flowchart is generally arranged according to the two tiers. Tier I pertains to selection of a minimum subset of servers needed to support an anticipated net workload, and powering on only the servers needed to support that workload. Tier II pertains to ranking the individual workload units (clients) and distributing the clients to the selected subset of servers in a manner that more evenly apportions workload mean and variance among the subset of servers. Tier I may be performed at a relatively low rate, such as once per day, and Tier II may be performed more frequently, such as once per hour, such that several iterations of Tier II may occur for each iteration of Tier I. In this respect, Tier II may be regarded as a subroutine of Tier I.

Tier I begins in step 100 with the initiation of a timer ("Timer 1"). Tier I is structured as a loop that may be repeated continuously. Thus, each additional performance of step 100 may involve "restarting" Timer 1. Timer 1 will time a "major time interval," during which one iteration of the Tier I loop is performed. The major time interval may be a day, a week, or whatever time period during which Tier I is elected to be performed. For example, if the major time interval is one day, then Tier I may be repeated once per day. This is convenient for establishing a regular schedule of server selection. Each new iteration of Tier I may begin at a time of day wherein any service interruption would have minimal impact, such as late at night during non-working hours of a company that owns and operates the computer system.

In step 102, an anticipated net workload is determined. The anticipated net workload may be historically determined. For example, each iteration of the Tier I loop may conclude with a net workload being supported on the computer system, and this net workload may be selected as the anticipated net workload for the subsequent iteration of Tier I loop. The net workload may be expressed in terms of any of a variety of workload metrics known in the art, such as CPU utilization, network I/O traffic, disk I/O traffic, and memory utilization.

Steps 104 and 106 involve the selection of a subset of servers sufficient to reliably support the anticipated net workload. Step 104 involves determining the server capacity necessary to support the anticipated net workload, and step 106 involves selecting a subset of the available servers that has at least the combined server capacity determined in step 104. Each server may have an associated nominal workload capacity. Enough servers should be selected to provide a combined workload capacity that is equal to or greater than the anticipated net workload. The actual workload may vary during the course of a day or whatever major time interval is selected, so for the sake of reliability, enough servers may be selected so that the combined workload capacity of the selected servers is greater than the anticipated net workload by a predefined margin or "safety factor."

To minimize power consumption and prolong equipment life, the selected subset of servers may be powered on in step 108, and the remaining servers may be powered off in step 110. The servers to power on and power off may be determined according to a relatively simple heuristic, wherein the servers that have been powered on the longest are turned off and the servers that have been powered off the longest are turned on, such that an appropriate number of servers are turned on. This approach may prolong equipment life, more evenly spreading the service demand among all of the equipment over time. The relatively simple heuristic also has the advantage of providing a fast and deterministic selection of servers.

Once the subset of servers is determined and powered on, the net workload may be apportioned among the subset of servers according to step 112. Because step 112 precedes the initiation of Tier II, sufficient workload data may not yet be available for assigning the clients according to a more precisely weighted apportionment. Again, however, historical workload data, such as information about the apportionment of clients in previous iterations of Tier II, may be used to determine the apportionment in step 112. Furthermore, it should be recognized that in an ongoing operation with active clients running on the servers, it may be desirable to temporarily power on all the servers, migrate each client to their newly assigned server, then power off the remaining servers. In this manner, the clients continue to run during the migration. Furthermore, the set of clients previously assigned to a server being powered off may be simple reassigned to a server being powered on.

An iteration of Tier II begins with step 120, with the initiation of a timer ("Timer 2"). Tier II is structured as a loop that may be continuously repeated. Thus, an initial performance of Tier II may involve "starting" Timer 2, while subsequent performance of step 120 may involve "restarting" Timer 2. Timer 2 will time a "minor time interval," during which one iteration of the Tier II loop is performed. The minor time interval is typically less than the major time interval selected for Tier I. For example, if the major time interval is one day and the minor time interval is one hour, then Tier II would be performed hourly, and up to 24 iterations of Tier II may be performed for each daily iteration of Tier I.

The mean and variance of the workload for each client are monitored in step 122, using any of a variety of techniques known in the art for monitoring and recording workload. These parameters may be continuously monitored for the bulk of the minor time interval, as indicated in conditional step 124. If more precise timing of Tier II is desired, these parameters may be monitored for slightly less than the minor time interval, so that remaining steps in Tier II may be completed within the specified minor time interval.

Once sufficient mean and variance data have been recorded, the clients may be ranked in step 126 according to equally weighted mean and variance, using any of the techniques discussed in connection with FIGS. 1-4, for example. In step 128, the clients may be distributed or redistributed as necessary among the subset of servers according to client rank. If the desired apportionment of the clients has not changed from the initial or previous apportionment, then the clients may remain on the servers to which they were previously assigned. Assuming the desired apportionment of the clients has changed, however, clients may be migrated between the servers, as necessary to satisfy the updated apportionment.

Upon completion of an iteration of Tier II, the method returns to step 114 of the flowchart, wherein Timer 1 is referenced to determine whether the major time interval has yet elapsed. If the major time interval has expired, then a new iteration of Tier I begins with resetting Timer 1 according to step 100. Otherwise, a new iteration of Tier II begins with resetting Timer 2 according to step 120.

An overall workload management approach may be conducted by seamlessly integrating the workload allocation techniques taught herein with conventional techniques for managing power. For example, predictive power management schemes such as DVS and DVFS may be performed to manage power on individual servers having been apportioned workload according to the processes outlined in the flowchart. These predictive power management techniques may be used to selectively control frequency and voltage to processors on the servers used to process the workload. Because the workload apportionment techniques according to the present invention tend to normalize or homogenize the distribution of mean and variance among the selected subset of servers, the predictive power management schemes may be applied with increased certainty, for more uniform and predictable results. Thus, optimal operating efficiency may be achieved, along with associated reductions in cost, heat, and noise, and prolonged equipment life.

It should be recognized that the invention may take the form of an embodiment containing hardware and/or software elements. Non-limiting examples of software include firmware, resident software, and microcode. More generally, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code typically includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters.

Figure 6:
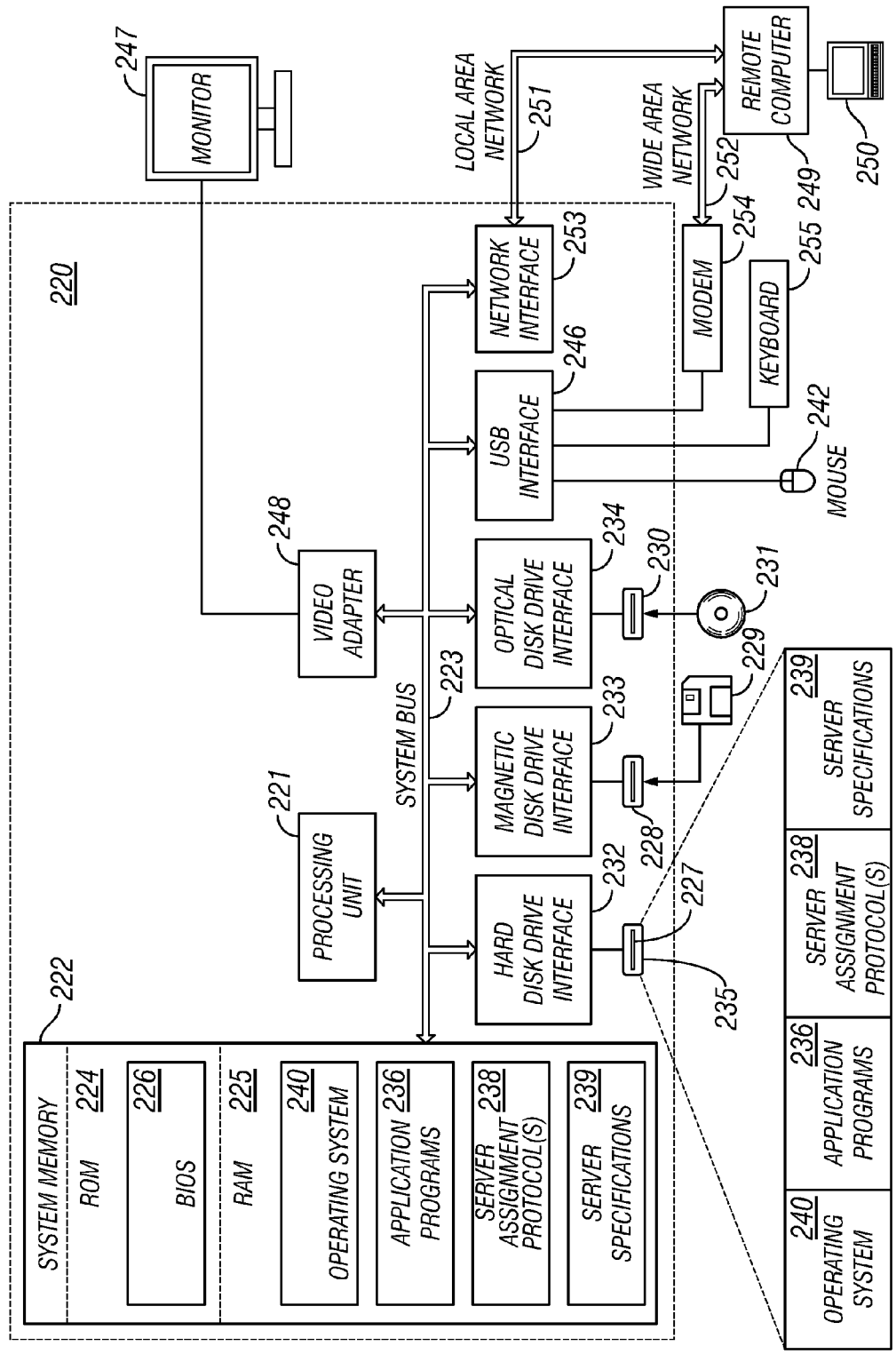
FIG. 6 is a schematic diagram of a computer system that may be configured for managing its own workload or the workload of another computer system according to an embodiment of the invention.

FIG. 6 is a schematic diagram of a computer system generally indicated at 220 that may be configured for managing its own workload or the workload of another computer system according to an embodiment of the invention. The computer system 220 may be a general-purpose computing device in the form of a conventional computer system 220. Generally, computer system 220 includes a processing unit 221, a system memory 222, and a system bus 223 that couples various system components, including the system memory 222 to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226 is stored in ROM 224, containing the basic routines that help to transfer information between elements within computer system 220, such as during start-up.

Computer system 220 further includes a hard disk drive 235 for reading from and writing to a hard disk 227, a magnetic disk drive 228 for reading from or writing to a removable magnetic disk 229, and an optical disk drive 230 for reading from or writing to a removable optical disk 231 such as a CD-R, CD-RW, DV-R, or DV-RW. Hard disk drive 235, magnetic disk drive 228, and optical disk drive 230 are connected to system bus 223 by a hard disk drive interface 232, a magnetic disk drive interface 233, and an optical disk drive interface 234, respectively. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide nonvolatile storage of computer-executable instructions, data structures, program modules, and other data for computer system 220. For example, the operating system 240 and application programs 236 may be stored in the RAM 225 and/or hard disk 227 of the computer system 220.

A user may enter commands and information into computer system 220 through input devices, such as a keyboard 255 and a mouse 242. Other input devices (not shown) may include a microphone, joystick, game pad, touch pad, satellite dish, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computers typically include other peripheral output devices (not shown), such as speakers and printers.

The computer system 220 may operate in a networked environment using logical connections to one or more remote computers 249. Remote computer 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 6. The logical connections depicted in the figure include a local area network (LAN) 251 and a wide area network (WAN) 252. Such networking environments are commonplace in offices, enterprise-wide computer networks, intranets, and the internet.

When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the internet Modem 254, which may be internal or external, is connected to system bus 223 via USB interface 246. In a networked environment, program modules depicted relative to computer system 220, or portions thereof, may be stored in the remote memory storage device 250. It will be appreciated that the network connections shown are exemplary and other means of establishing a communications link between the computers may be used.

Program modules may be stored on hard disk 227, optical disk 231, ROM 224, RAM 225, or even magnetic disk 229. The program modules may include portions of an operating system 240, application programs 236, or the like. A server assignment protocol database 238 may be included, which may contain predefined protocols for assigning clients to servers after the clients have been ranked according to equally weighted mean and variance. A server specification database 239 may also be included, which may contain individual specifications on the servers, such as nominal workload capacity, net power handling, and so forth.

Aspects of the present invention may be implemented in the form of application program 236. Application program 236 may be informed by or otherwise associated with server assignment protocol database 238 and/or server specification database 239. The application program 236 generally comprises computer-executable instructions for managing workload according to the invention, including identifying a subset of servers from among available servers sufficient to support a net workload, and for apportioning clients among servers according to equally weighted workload mean and variance.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of managing workload in a computer system having a plurality of servers, comprising:
    obtaining the workload mean and the workload variance for each of a plurality of workload units;
    ranking the workload units according to a mathematical combination of the mean and the variance;
    distributing the workload units among the servers according to their rank; and
    periodically repeating the steps of obtaining the workload mean and workload variance.

2. The method of claim 1, further comprising:
    determining the net amount of workload mean and workload variance for all of the plurality of workload units;
    selecting and running a subset of the servers sufficient to support the net amount of workload; and
    distributing the workload units among the subset of the servers.

3. The method of claim 2, further comprising selectively powering off the servers not included in the subset of the servers.

4. The method of claim 3, further comprising:
    identifying which of the plurality of servers have been powered off and the duration over which the server has been powered off;
    identifying which of the plurality of servers have been powered on and the duration over which the server has been powered on; and
    selectively powering off one or more of the servers having been powered on the longest and powering on one or more of the servers having been powered off the longest, wherein the selected number of servers are turned on.

5. The method of claim 1, wherein the mathematical combination of workload mean and workload variance comprises the sum or product of the workload mean and the workload variance.

6. The method of claim 1, wherein weighing the workload mean and workload variance for each workload unit comprises electronically plotting workload mean versus workload variance for each workload unit, determining the orthogonal projection onto a diagonal line from the origin of the plot, and sorting the workload units according to the order of their projections along the diagonal line.

7. The method of claim 1, further comprising:
    controlling power to the servers according to a predictive power management scheme.

8. The method of claim 1, wherein the predictive power management scheme is selected from the group consisting of DVS and DVFS.

9. A computer program product including computer usable program code embodied on a computer usable storage medium for managing workload in a computer system, the computer program product comprising:
    computer usable program code for obtaining the workload mean and workload variance associated with each of a plurality of workload units;
    computer usable program code for ranking the workload units according to a mathematical combination of the workload mean and the workload variance;
    computer usable program code for apportioning the workload units among the servers according to rank; and
    computer usable program code for periodically repeating the steps of obtaining the workload mean and workload variance, ranking the workload units, and apportioning the workload units among the servers.

10. The computer program product of claim 9, further comprising:
    computer usable program code for determining the net workload of the plurality of workload units;
    computer usable program code for selecting a subset of the servers sufficient to support the net workload; and
    computer usable program code for distributing the workload units among the determined subset of the servers.

11. The computer program product of claim 10, further comprising computer usable program code for selectively powering off the servers not included in the subset of the servers.

12. The computer program product of claim 11, further comprising:
    computer usable program code for identifying which servers have been powered off and for how long;
    computer usable program code for identifying which servers have been powered on and for how long; and
    computer usable program code for selectively powering off one or more of the servers having been powered on the longest and powering on one or more of the servers having been powered off the longest.

13. The computer program product of claim 9, wherein the computer usable program code for weighing the workload and variance for each workload unit comprises computer usable program code for computing the sum or product of the workload mean and the workload variance and sorting the workload units according to the computed sum or product.

14. The computer program product of claim 9, further comprising computer usable program code for controlling power to the servers according to a predictive power management scheme.

15. The computer program product of claim 9, wherein the predictive power management scheme is selected from the group consisting of DVS and DVFS.

* * * * *